United States Patent [19]

Otouma et al.

[11] Patent Number: 4,780,356

[45] Date of Patent: Oct. 25, 1988

[54] RECORDING SHEET

[75] Inventors: Hiroshi Otouma, Yokohama; Hitoshi Kijimuta, Ebina; Katsutoshi Misuda; Nobuyuki Yokota, both of Yokohama, all of Japan

[73] Assignee: Asahi Glass Company Ltd., Tokyo, Japan

[21] Appl. No.: 911,136

[22] Filed: Sep. 24, 1986

[30] Foreign Application Priority Data

| | | | |
|---|---|---|---|
| Sep. 24, 1985 | [JP] | Japan | 60-208742 |
| Oct. 1, 1985 | [JP] | Japan | 60-216184 |
| Oct. 1, 1985 | [JP] | Japan | 60-216185 |
| Nov. 11, 1985 | [JP] | Japan | 60-250699 |
| Jun. 2, 1986 | [JP] | Japan | 61-125862 |

[51] Int. Cl.[4] .............................................. B32B 7/02

[52] U.S. Cl. ................................ 428/212; 346/135.1; 427/261; 428/195; 428/206; 428/211; 428/213; 428/216; 428/321.3; 428/323; 428/329; 428/330; 428/331; 428/537.5

[58] Field of Search ................ 427/261; 428/195, 211, 428/321.5, 331, 537.5, 206, 212, 213, 216, 323, 329, 330; 346/135.1

[56] References Cited

U.S. PATENT DOCUMENTS 4,460,637 7/1984 Miyamoto et al. ................ 428/211

*Primary Examiner*—John E. Kittle
*Assistant Examiner*—P. R. Schwartz
*Attorney, Agent, or Firm*—Oblon, Fisher, Spivak, McClelland & Maier

[57] ABSTRACT

A recording sheet comprising a sheet of paper and porous particles provided on the paper surface, said porous particles having an average pore size of from 10 to 5000 Å, a pore volume of from 0.05 to 3.0 cc/g and an average particle size of from 0.1 to 50 μm.

28 Claims, 1 Drawing Sheet

RECORDING SHEET

The present invention relates to a recording sheet. More particularly, it relates to a recording sheet for an ink jet printer, which makes printing of a sharp and high image quality possible.

A recording sheet for recording by means of an ink, particularly a recording sheet for an ink jet printer, is required to provide a high image quality such as color sharpness and high resolution.

Heretofore, such a recording sheet is prepared by coating a silica-type porous fine powder on a paper surface by means of a water-soluble polymer such as polyvinyl alcohol as a binder so that an ink can be impregnated therein.

However, with such a recording sheet, the density of the recorded characters or images is not necessarily uniform, and such a recording sheet has a drawback that the sharpness of the color tone is inferior.

The present inventors have studied the causes for such drawbacks, and have found that the porous structure of the porous fine powder used, is defective, and the impregnated ink is likely to migrate partly from relatively large pores to small pores thus creating vacant spaces, whereby there will be a difference in the refractive index from other portions, and color shading or whitening of the color is likely to be led.

The present inventors have conducted various researches and studies with an aim to overcome such undesirable phenomena, and as a result, have found that the above object can be attained by adjusting the physical properties of the particles to be impregnated with an ink and disposing such particles on the paper surface in a certain specific manner.

Thus, the present invention provides a recording sheet comprising a sheet of paper and porous particles provided on the paper surface, said porous particles having an average pore size of from 10 to 5000 Å, a pore volume of from 0.05 to 3.0 cc/g and an average particle size of from 0.1 to 50 μm.

For the purpose of the present invention, "paper" includes not only conventional papers made of wood pulps, but also synthetic papers such as non-woven fabrics or plastic sheets. Specific examples of such papers are disclosed in "Practical Knowledge of Papers and Pulps" published in 1975 by Toyo Keizai Shinpo K.K.

Now, the present invention will be described in detail with referece to the preferred embodiments.

Figure 1:
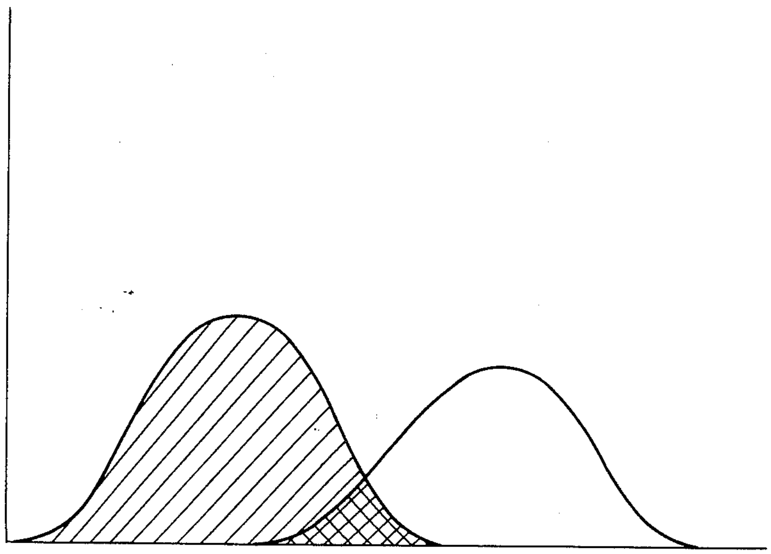
FIG. 1 is a graph illustrating the overlapping degree of the pore sizes of the particles in the coating layer of the recording sheet having a double-layer structure according to the present invention.

According to the present invention, the porous particles have an average pore size of from 10 to 5000 Å, a pore volume of from 0.05 to 3.0 cc/g and an average particle size of from 0.1 to 50 μm.

The shape of such particles is preferably close to a true sphere as far as possible in order to avoid color shading.

The particles may be made of, for example, silica, silica-alumina, alumina, silica-boria or silica-magnesia. Among them, silica is particularly preferred since it is possible, by using silica, to bring the refractive index close to that of an aqueous ink commonly employed in an ink jet printer.

They may be prepared, for instance, by neutralizing water glass with various acids or acidic salts, or by decomposing silicon tetrachloride.

Within the above-mentioned ranges of the physical properties, the particles preferably have an average pore size of from 75 to 350 Å, a pore volume of from 0.6 to 2.5 cc/g and average particle size of from 5 to 30 μm, whereby the adhesion of the coating layer to the base paper, the absorption rate of the ink into the particles and the peripheral sharpness of ink dots will be particularly good.

Such particles may be coated on a paper surface by means of a binder such as polyvinyl alcohol in the same manner as in the conventional recording papers of this type, and yet an image quality higher than the conventional recording papers is obtainable. From a further research, the present inventors have found it possible to obtain an image of a higher quality by providing such particles on the paper surface in a certain specific manner.

According to such a manner, the particles are arranged in the coated layer with a certain distance from one another so that void spaces exist among them, whereby firstly an ink can be maintained in the spaces among the particles, and then the ink is taken into the particles. In this manner, the spaces among the particles not only constitute passages but also serve as temporary resevoirs for the ink. The refractive index of the spaces is equal to the refractive index of air. The airy space has a substantially lower refractive index than the particles filled with an ink, and thus the spaces themselves cause the scattering of light.

Therefore, the smaller the spaces among the particles, the better. Taking into accounts of such functions as the passages and reservoirs for the ink, the spaces are preferably from 0.01 to 10 μm. Further, from the viewpoint of the function of maintaining the ink i.e. the amount of the ink impregnated in the particles, the volume of the spaces is also of importance. As such a volume of the spaces, it is preferred to employ a volume of from 0.1 to 3.5 cc/g of the particles constituting the coating layer when the layer is considered as a shaped body. If the volume of the spaces is less than this range, it is difficult to supply the ink sufficiently to the particles. On the other hand, if the volume exceeds the above range, the proportion of the spaces occupied by the particles within the entire space for the layer structure tends to be too small, whereby the color developing properties tend to deteriorate and falling off of the powder from the coating layer tends to increase, such being undesirable.

Such an arrangement of the particles can be accomplished by e.g. a method wherein an aqueous slurry of a mixture comprising the powder and polyvinyl alcohol (PVA) in a ratio of 4:1, is prepared, and the aqueous slurry is applied to a base sheet, and the coated sheet is subjected to pressing or compression by means of calender rolls or static press while the slurry has not yet been completely dried. Otherwise, the formation of the coating layer may be conducted in several times to increase the packing density of the coating layer.

If the thickness of the coating layer is too thin, blotting takes place. On the other hand, if the coating layer is too thick, no further improvement in the effectiveness is obtainable, thus leading to waste of materials such as the ink. Therefore, it is preferred to employ a thickness of from 1 to 75 μm, preferably from 10 to 60 μm.

When the above arrangement of particles is employed, the ink firstly fills the spaces among the particles, and then penetrates and diffuses into the particles, whereby the ink is sufficiently maintained in the particles. It takes a certain time for such a process to be completed, but such a time creates no practical problem. If desired, the image quality can be stabilized quickly by heating at a temperature of about 50° C. after the printing operation.

Further, since the ink held in the spaces among the particles, takes a certain time before it is taken into the particles, there is an advantage such that in the case where two types of inks are mixed for color development, uniform mixing in a liquid state takes place in the spaces among the particles, whereby the inks are taken into the particles in a uniformly mixed state to provide a uniform mixed color.

From a further research, the present inventors have found the following facts.

Namely, when the porous particles are spherical particles having no substantial irregularities on the surface, the scattering of light from the surface is minimum. It has been found that when an aqueous ink is filled in such particles, particularly in the interior of silica particles, the refractive index resembles that of water or a solvent such as ethylene glycol, thus it provides a function as a coloring pigment similar to so-called colored glass beads.

Further, in the state where the spherical particles are coated on e.g. paper, they give the same appearance for any direction i.e. there is no anisotropy. The same is true even when they have absorbed an ink. The spherical particles have excellent condensing and reflecting properties, and they are distinctive from one another as individual particles. The diffusion of the ink drops is uniform and clearly defined. Thus, it has been found possible to obtain an image of a high quality.

It has been also found that good results will be obtained when such spherical particles are present in an amount of a certain level in the state as described hereinafter.

The above-mentioned preferred properties can be obtained when at least 30% of the porous particles are spherical particles. Namely, the porous particles are not necessarily all spherical.

The spherical particles are ideally of a spherical degree of 100. However, in the present invention, the spherical degree may be within a range of from 60 to 100.

In the present invention, the spherical particles have a spherical degree of from 60 to 100 as mentioned above, and the proportion of the spherical particles may be at least 30% in the porous particle layer, and the rest of less than 70% may be semi-spherical or oval in their cross section, or may be of a so-called non-specific shape.

The spherical particles to be employed, are also required to have an average particle size of from 0.1 to 50 μm. The particle size distribution is also influential to the image quality. Particularly preferred examples of such a particle size distribution will be given in the following table with respect to those having an average particle size of not more than 10 μm. The same applies to those having an average particle size of more than 10 μm. One of Sample Nos. 1 to 7 may be employed taking into accounts the density of dots of the ink jet printer, the ink properties and the amount of the ink to be applied.

| Sample No. | Weight proportions | | |
|---|---|---|---|
| | 50% or higher (μm) | 40% or less (μm) | 10% or less (μm) |
| 1 | 1 to less than 4 | 0.5 to less than 1 | Less than 0.5 |
| | | 4 to less than 7 | At least 7 |
| 2 | 1 to less than 5 | 0.5 to less than 1 | Less than 0.5 |
| | | 5 to less than 8 | At least 8 |
| 3 | 3 to less than 6 | 1 to less than 3 | Less than 1 |
| | | 6 to less than 9 | At least 9 |
| 4 | 3 to less than 7 | 2 to less than 3 | Less than 2 |
| | | 7 to less than 10 | At least 10 |
| 5 | 4 to less than 8 | 2 to less than 4 | Less than 2 |
| | | 8 to less than 11 | At least 11 |
| 6 | 5 to less than 9 | 3 to less than 5 | Less than 3 |
| | | 9 to less than 12 | At least 12 |
| 7 | 6 to less than 10 | 4 to less than 6 | Less than 4 |
| | | 10 to less than 14 | At least 14 |

When the porous particles contain spherical particles within the above-mentioned range, highly precise printings with clear color tones and image quality, are always obtainable particulary when the porous particles have, within the above-mentioned ranges of the physical properties, an average particle size of from 5 to 30 μm, an average pore size of from 75 to 350 Å and a pore volume of from 0.6 to 2.5 cc/g.

For the application of such particles to the paper surface, not only the above-mentioned polyvinyl alcohol, but also other water-soluble polymer substances such as SBR latex, may be used alone or as a mixture. Further, inorganic oxides such as a silica sol or an alumina sol, may also be incorporated, and such incorporation is preferred in some cases.

With respect to the proportions of the particles and the binder, if the amount of the binder is too small, it becomes difficult to adequately fix the particles to the paper surface, and if the amount is excessive, the particles tend to be hardly effective to provide a high image quality. Therefore, the binder is used usually within a range of from 5 to 60% by weight, preferably from 20 to 40% by weight, relative to the total amounts of the binder and the particles.

A suitable conventional method may be employed for the production of spherical particles to be employed in the present invention. For instance, in the case of silica particles, it is possible to employ a method wherein a silica sol immediately prior to gelation, is forcibly sprayed in air so that the gelation takes place during the flight, or a method wherein the silica sol is instantaneously converted to a dry gel via a hydrogel by using a spray dryer.

When the porous particles contain spherical particles as mentioned above, it is preferred to provide an intermediate layer composed of non-spherical particles having a spherical degree of less than 60, between the substrate and the porous particle layer of the present invention, whereby the adhesive strength of the particles to the substrate can be improved without imparing the high image quality.

The non-spherical particles (i.e. particles having a spherical degree of less than 60) contained in an amount of less than 70% in the porous particles and the non-spherical particles constituting the intermediate layer, usually have an apparent average particle size of from 0.1 to 20 μm. If the average particle size is less than the above range, the absorption of an ink tends to be poor, whereby the image quality will be impaired. On the other hand, if the average particle size exceeds the above range, the bonding strength among the particles, between the paper and the particles, or with the spherical particles, tends to deteriorate, such being undesirable.

In order to provide an intermediate layer as mentioned above, a method may be employed wherein firstly non-spherical particles are applied to a paper surface by a binder such as polyvinyl alcohol, as mentioned above, and then while the coating layer is still wet or half-dried, porous particles containing spherical particles, are applied thereon in a similar manner.

In such a case, it is preferred to partially embed the porous particles containing spherical particles in a layer of non-spherical particles by means of e.g. calender rolling, to obtain the maximum bonding strength. It is thereby possible to obtain good results also with respect to the image quality.

The spherical degree used for the definition of the spherical particles in the present invention, means 100 times the ratio of the minimum diameter to the maximum diameter of a particle.

In the present invention, it is preferred to adopt a double layer structure as described above even when the porous particle layer is composed of non-spherical particles containing no spherical particles.

In such a case, it has been found that there are two types of preferred embodiments for the intermediate particle layer formed between the substrate and the porous particle layer.

In the first embodiment, the intermediate layer is composed of particles which do not substantially absorb an ink. In the second embodiment, the intermediate layer is composed of porous particles having an average pore size larger than the average pore size of the porous particles constituting the porous particle layer i.e. the overlayer, and the overlapping degree of the pore sizes of the two types of porous particles, is not higher than 30% as represented by the pore volume.

Firstly, the first embodiment will be described.

In the conventional recording sheets, a porous fine powder capable of absorbing an ink, is simply coated on a paper surface by a binder, as mentioned above. Such a fine powder, when brought in contact with an ink, is unable to instantaneously absorb the entire amount, and it takes a certain time for the absorption. Therefore, the ink drop is likely to spread in a fairly wide range among the particles of the fine powder. The color density tends to be low towards the forward end of the spread, and the ink tends to spread unnecessarily widely, whereby the entire color density tends to be low correspondingly. Thus, there have been drawbacks that the sharpness and the resolution tend to deteriorate, and the color shading or blotting is likely to take place. It has now been found it possible to overcome the above drawbacks by suppressing the unnecessary spread of the ink drop and to have a necessary amount of the ink drop absorbed certainly in the porous particles. For this purpose, it has been found desirable to provide an intermediate layer composed of particles which per se do not substantially absorb an ink, but which are capable of maintaining an ink in the spaces among the particles. The coating layer in direct contact with the paper, is composed of particles which do not substantially absorb an ink, and such particles are disposed so that they have a suitable distance from one another and a suitable apparent thickness, whereby it is made possible to maintain an ink in the spaces among the particles.

The average particle size of such particles, is usually from 0.05 to 200 μm. If the average particle size is less than this range, the spaces among the particles tend to be too small, whereby the force for maintaining the ink drop is likely to be too high, and the diffusion of the ink into the porous particles tends to be slow, or in the case where a mixing color is to be obtained, the mixing of inks in these spaces, tend to be imperfect. On the other hand, if the average particle size exceeds the above range, the force for maintaining the ink drop in the spaces among the particles, will be too weak, and undesirable movement of the ink drop is likely to result within the layer of the particles due to vibration of the paper or due to the gravity.

Within the above range, it is particularly preferred to employ an average particle size of from 1 to 50 μm, whereby no such problems as mentioned above will be brought about, and the desired condition can be constantly obtained.

Further, the spaces among such particles are preferably within a range of from 0.01 to 100 μm. If the spaces are less than this range or more than this range, the disadvantages as described with respect to the above-mentioned particle sizes, are likely to result.

It is particularly preferred to employ spaces among the particles within a range of from 0.02 to 25 μm, whereby the desired condition is constantly obtained without bringing about the above-mentioned drawbacks.

In order to practically obtain such spaces among the particles, it is possible to employ, for example, a method wherein an organic binder such as polyvinyl alcohol or a metal oxide sol such as an alumina sol, a titania sol or a zirconia sol may be employed for coating, or may be used in combination, or a method wherein the thickness and the degree of the spaces among the particles are controlled by pressing by means of e.g. calender rolling after the coating operation, as will be described hereinafter.

The apparent thickness of the layer formed by such particles, is suitably within a range of from 5 to 300 μm. If the apparent thickness of the layer is less than this range, the capacity for mainaining the ink in this layer will be small, and the penetration of the ink into the paper tends to increase, such being undesirable. On the other hand, if the apparent thickness exceeds the above range, an unnecessary coating layer increases, whereby the adhesion of the coating material to the paper tends to be poor, and the falling off of the coating layer is likely to be brought about. Within the above range, it is particularly preferred to employ a range of from 20 to 70 μm, whereby the capacity for maintaining the ink can be met for various ink dot densities, and a coating layer having good adhesion to the paper, is obtainable by optionally using e.g. polyvinyl alcohol or a metal oxide sol.

Thus, such a layer is formed on a paper surface, and theh the afore-mentioned porous particle layer for absorbing the ink, is formed thereon. Such a porous particle layer is designed to absorb the ink maintained in the spaces among the particles in the above-mentioned intermediate layer by a capillary phenomenon, so that a color development is conducted.

The apparent thickness of the layer formed by such porous particles, is preferably within a range of from 1 to 75 μm. If the apparent thickness of the layer is less than the above range, the coloring layer tends to be small, whereby the color density of the ink dots tends to be low, or the ink tends to remain in the layer for maintaining the ink. On the other hand, if the thickness exceeds the above range, a particle layer not absorbing an ink is likely to form on the layer which undergo color development upon absorption of the ink, and the ink tends to thinly spread over the entire layer, whereby the ink density tends to be low.

Within the above range, it is particularly preferred to employ a range of from 10 to 70 μm, whereby the above-mentioned drawbacks can completely be eliminated.

As a practical method for forming the two layers on a paper surface, it is possible to employ a method wherein a non-porous particle layer is preliminarily prepared in accordance with the above-mentioned method, and after drying it or half-drying it, porous particles may be coated by the above-mentioned method by using e.g. polyvinyl alcohol or the above-mentioned metal oxide sol as a binder. Further, after-treatment such as pressing may be conducted.

Further, the average size of the spaces among the particles in the non-porous particle layer is smaller than the average size of the porous particle layer, preferably from $\frac{2}{3}$ to 1/100, more preferably from $\frac{1}{2}$ to 1/50 of the latter. If the average size of the spaces is outside this range, it is likely that the absorption of the ink into the color developing layer tends to be slow, or no adequate absorption takes place.

Thus, with the recording sheet of this embodiment, an ink drop injected from a printer nozzle to the paper surface, is firstly held in the spaces among the particles constituting the intermediate layer without undue flow or spread, and then rapidly absorbed by a capillary phenomenon into the porous particles constituting the overlayer, whereby a sufficient color development and an accordingly high image quality without no color shading or blotting will be obtained.

Further, if an intermediate color is required, for instance, two types of inks are dropped to the same spot, whereupon they are mixed in a liquid state in the spaces among the particles constituting the intermediate layer, and then absorbed into the particles of the overlayer. This is extremely advantageous for the color development of a mixed color.

In this embodiment, both the particles which do not substantially absorb an ink and the porous particles which absorb an ink, may be made of a suitable material such as silica, silica-alumina, alumina, silica-boria or silica-magnesia.

Now, the second embodiment having a double layer structure will be described.

As mentioned above, in the conventional recording sheets, a porous fine powder capable of absorbing an ink is simply coated on a paper surface by a binder, and when brought in contact with an ink, such a fine powder is unable to instantaneously absorb the entire amount, and it takes certain time for the absorption. Therefore, the ink drop tends to spread in a fairly wide range among the particles of the fine powder. The color density tends to be low towards the forward end of the spread, and the ink tends to spread unnecessarily widely, whereby the entire color denstty tends to be low correspondingly. Thus, there have been drawbacks that the sharpness tends to be low, and the color shading or blotting is likely to result. It has now been found it possible to overcome these drawbacks by suppressing the unnecessary spread of the ink drop and to have the ink drop absorbed certainly into the porous particles.

For this purpose, according to this embodiment, two porous particle layers having different porous particles are provided on a paper surface, wherein the overlapping degree of the pore sizes of the two types of the porous particles is at least 30% as represented by the pore volume, and the average pore size of the intermediate layer is larger than the average pore size of the overlayer.

Namely, the particles of the porous particle layer constituting the intermediate layer i.e. the particles of the layer which is in direct contact with the paper, preferably have particle sizes, the overlapping degree of which with the pore sizes of the particles constituting the overlayer, is not higher than 30% as represented by the pore volume.

Here, the overlapping degree of the pore sizes as represented by the pore volume, has the following meaning.

Namely, with respect to the overlapping portion when the pore size distribution curves are drawn for the two types of the particles, the pore volume (cc/g) of the particles having a larger average particle size is not higher than 30% of the total pore volume (cc/g) of the particles having a smaller average pore size. As shown in FIG. 1, this means that the area of the crisscrossed oblique lines is not higher than 30% of the area of simple oblique lines which denotes the total pore volume of the particles with smaller average pore size.

Thus, as between the particles constituting the two layers, if the overlapping degree of the pore sizes exceeds 30% as represented by the pore volume, the ink absorbed in the intermediate layer, will not be adequately transferred to (absorbed by) the overlayer, and the degree of the color development decreases correspondingly.

Such an overlapping degree is preferably not higher than 15%, whereby almost all the ink absorbed in the intermediate layer, will be transferred to the overlayer.

The porous particles constituting the intermediate layer preferably has an average pore size of from 0.05 to 5 μm, a pore volume of from 0.05 to 3.0 cc/g and an average particle size of from 0.1 to 50 μm. If these physical properties are outside the respective ranges, there will be drawbacks such that the absorbed ink tends to diffuse into the paper fibers, the mechanical strength of the particles tends to be low, or the layer tends to be too dense or is likely to undergo peeling off the paper fibers. Within the above-mentioned ranges of the physical properties, it is particularly preferred to employ an average particle size of from 0.08 to 0.1 μm, a pore volume of from 1.0 to 2.0 cc/g and an average particle size of from 0.5 to 30 μm, whereby a proper absorption of the ink can be ensured and a proper intermediate structure can be formed together with a binder.

The apparent thickness of the particle layer constituting the intermediate layer is preferably from 1 to 75 μm from the viewpoint of the maintenance of the ink drop as well as from the viewpoint of the applicability of the coating paper, the convenience in handling and the cost.

As a method for forming such an intermediate particle layer on the paper surface, there may be mentioned a method wherein an organic binder such as polyvinyl alcohol or a metal oxide sol such as a silica sol, an alumina sol, a titania sol or a zirconia sol, is used alone or in combination to coat the porous particles onto the paper surface.

In such a case, the binder is used usually in an amount of from 10 to 50% by weight relative to the total amount of the porous particles and the binder.

Then, an overlayer of the above-mentioned porous particles, is formed on the intermediate particle layer thus formed.

The average pore size of the porous particles constituting the overlayer is required to be smaller than the average pore size of the porous particles constituting the intermediate layer.

In this embodiment, an ink drop injected, is firstly absorbed in its major portion by the porous particles constituting the intermediate layer having a larger average pore size, and then absorbed by the capillary phenomenon by the porous particles having a smaller average pore size constituting the overlayer, whereby the ink is uniformly condensed in a thin layer, and an adequate color development can be accomplished.

As mentioned above, the porous particles consituting the overlayer are required to have an average pore size of from 10 to 5000 Å, a pore volume of from 0.05 to 3.0 cc/g and an average particle size of from 0.1 to 50 μm. If the physical properties are outside these ranges, there will be drawbacks such that the absorption rate of an ink is too low, the ability of maintainaing an ink is inadequate so that the ink reversely diffuses to the intermediate layer, the color development is inadequate, the mechanical strength of the particles is inadequate, the layer formed is too dense, or the powder is likely to fall off from the coating layer.

Within the above-mentioned ranges of the physical properties, particularly preferred are an average pore size of from 75 to 350 Å, a pore volume of from 0.6 to 2.5 cc/g and an average particle size of from 5 to 30 μm, whereby an adequate ink maintaining ability and color development is obtainable, and a proper structure of the coating layer is formed so that the powder is firmly bonded.

The apparent thickness of the particle layer forming such an overlayer, is preferably from 1 to 35 μm from the viewpoint of the ability to maintain the ink, the color development and the applicability of the coated paper. The total thickness of the over and intermediate layers, is preferably from 5 to 300 μm, more preferably from 3 to 100 μm, from the viewpoint of the ability to maintain the ink, the color development properties, the applicability of the coated paper and the economical advantage.

As a method for forming the overlayer, it is possible to employ a method wherein the intermediate particle layer is preliminarily formed by the above-mentioned method, dried or half-dried, and then the particles for the overlayer are coated as mentioned above by using e.g. polyvinyl alcohol or the above-mentioned metal oxide sol as a binder. Further, after-treatment such as pressing may also be conducted.

It should be understood that the particle layer constituting the overlayer may not necessarily be laid on the intermediate layer, and may partly be embedded in the intermediate layer. However, it is not desirable that the particles for the two layers are completely mixed to form a single layer.

For the respective particles constituting the two layers, there is no need to pay any particular attention to the spaces among the particles, since a numerous pores in the particles serve as passages or reservoirs for the ink drops.

In this embodiment, the ink drop injected, is firstly swiftly absorbed by the porous particles having a larger average pore size constituting the intermediate layer, whereby an unnecessary spread of the ink is avoided. Then, the ink is absorbed by the porous particles having a smaller average pore size constituting the overlayer, whereupon the color development is accomplished. Thus, the color development can be conducted uniformly and with an adequate concentration, whereby a high image quality free from blotting or color shading is obtainable.

As the porous particles for the over and intermediate layers for this embodiment, there may be employed silica, silica-alumina, alumina, silica-boria or silica-magnesia.

In the present invention, the following embodiment may also be mentioned as a preferred embodiment.

Namely, on the surface of the porous particle layer, a coating layer composed of particles having an average particle size smaller than the porous particles is provided to make the surface of the porous particle layer smooth, whereby the scattering of light due to the fine irregularities on the surface of the porous particle layer, is prevented, and the color density and the color hue of the image can be improved.

In this embodiment, the above-mentioned effectiveness is particularly remarkable in a case where the porous particle layer is composed of the afore-mentioined spherical particles or aggregates formed by the fusion of such spherical particles, as compared with the case where non-spherical particles are used solely or together with spherical particles.

As the method for making the surface smooth, a mechanical method such as pressing, calender roll pressing or super calender roll pressing may be employed. However, it is preferred to employ a method wherein fine cavities on the surface are filled with spherical particles finer than the spherical particles of the porous layer, so that the surface is made smooth. In this case, the particles used for filling are preferably spherical particles so that the properties of the spherical particles of the porous layer can be maintained or improved. However, non-spherical particles may also be employed as the particles for filling. The average particle size of the fine particles to be used for filling, is preferably from $\frac{1}{2}$ to 1/1000, more preferably from $\frac{1}{2}$ to 1/700 of the average particle size of the spherical particles used for the recording layer of porous particles. If the particle size is outside this range, it is likely that the degree of smoothness is inadequate, or the filled portions are non-porous, whereby the intended effectiveness of this embodiment can not adequately be obtained.

As a fine particle filling method to accomplish the surface smoothness, various methods for surface treatment may be employed. For instance, the fine particles may be dispersed in a proper solvent such as water or an organic solvent having a relatively low boiling point such as an alcohol or acetone or formed into a paste or cake, and then the dispersion or the paste or cake is coated or applied onto the surface. Then, the solvent is evaporated by a suitable method of drying such as air drying or hot air drying. On the other hand, it is also possible to employ a method wherein a fine particle powder is coated in a dry system, as opposed to the above-mentioned wet system. In the case of the wet system, the coating or application method by means of a spray, a doctor blade, a knife coater or a bar coater, may be employed. Whereas, in the dry system, the embedding or filling may be conducted by means of a buff or polishing cloth.

The amount of the fine particles to be filled, varies depending upon the particle size of the spherical particles used for the recording layer. However, it is usually within a range of from 0.1 to 20 g/m$^2$, preferably from 0.5 to 10 g/m$^2$. If the amount is less than this range, the effectiveness is usually small, and if the amount exceeds this range, a thick layer composed solely of the fine particles will be formed, whereby there will be drawbacks such that the absorption of an ink deteriorates substantially.

Figure 2:
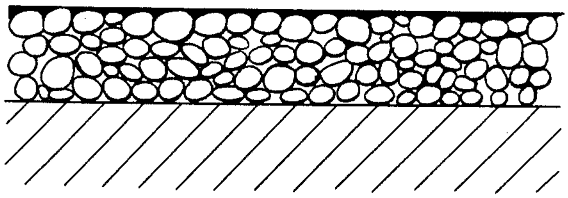
FIG. 2 is a cross-sectional view of an embodiment of the recording sheet of the present invention wherein the surface was smoothed.

FIG. 2 shows a cross-sectional view of a recording sheet according to this embodiment.

Figure 3:
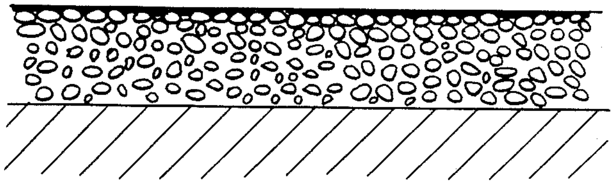
FIG. 3 is a cross-sectional view of another embodiment of the recording sheet of the present invention wherein the surface was smoothed.

FIG. 3 shows a cross-sectional view of another recording sheet according to this embodiment.

In FIG. 2, a layer containing spherical particles is formed on a paper surface, and fine particles are applied thereon to make the surface smooth.

In FIG. 3, a layer containing spherical particles is formed on a substrate with an intermediate layer interposed therebetween, and fine particles are applied thereon to make the surface smooth. In FIG. 3, the intermediate layer is composed of non-spherical particles.

As shown in FIGS. 2 and 3, the fine particles may be deposited in such a state that the fine particles more or less cover the spherical particles, or the fine particles more or less penetrate inwardly from the surface.

The fine particles which may be employed for such a purpose include various types, and may be selected from commercially available silica-type materials. For instance, Hi-Sil, manufactured by PPG Co., Fine Seal T-32, X-37, E-50 and Reoseal, manufactured by Tokuyama Soda Co., various aerosils manufactured by Nihon Aerosil K.K. or Syloid 150 manufactured by Fuji Dabizon K.K., may be used. Further, from the viewpoint of the diminished scattering of light, it is prefered to use spherical particles as the fine particles for the coating layer, although such spherical particles are not commercially available.

Now, the present invention will be described in further detail with reference to Examples. However, it should be understood that the present invention is by no means restricted to these specific Examples.

EXAMPLE 1

Into a stainless steel beaker having a capacity of 5 liters, 1 liter of sulfuric acid having a concentration of 16% was charged, and a dilute solution ($SiO_2$ concentration: about 7%) of No. 3 water glass separately prepared, was dropwise added thereto under stirring. The pH of the solution mixture was adjusted to 3.0. The stirring was continued, and after gelation, the stirring was continued for about 30 minutes. Then, 6N aqueous ammonia was dropwise added to bring the pH to 7.5.

The slurry thus obtained was granulated by using a spray dryer, to obtain substantially spherical particles having a particle size distribution within a range of from 30 to 120 μm. The particles were repeatedly washed on a Büchner funnel with a 1% ammonium carbonate aqueous solution to remove $Na^+$ and $SO_4^{--}$. Then, the particles were baked at 350° C. for 2 hours. Then, the particles were pulverized for 5 hours by using a vibration ball mill to obtain a silica powder having a particle size distribution within a range of from 0.3 to 15 μm. From this powder, a silica powder containing at least 95% of particles having a particle size of from 0.5 to 8 μm, was obtained by classification.

The pore size distribution was from 60 to 210 Å, the average pore size was 110 Å and the pore volume was 1.1 cc/g. A part of the powder was combined with polyvinyl alcohol PVA 117 binder in an amount of ¼ of the weight of silica, and then applied to a copying paper in 3 times to obtain a total thickness of 25 μm. After each application, the coating layer was pressed in a half-dried condition under a pressure of about 20 kg/cm$^2$ by means of calender rolls. The distribution of the spaces among particles in the coating layer, was from 950 to 1800 Å. The volume of the spaces was 0.4 cc/g.

A plurality of ink dots having a magenta color were printed onto the recording sheet by means of an ink jet printer with a dot density of 12 dots/mm.

The ink dots of about 100 μm had excellent roundness, and the color density of the ink dots as measured by a microdensitometer manufactured by Konishiroku Photo Ind. Co. Ltd., was 1.54, which is an adequately high density.

EXAMPLE 2

A part of the silica particles obtained in Example 1, was subjected to heat treatment at 550° C. for 2 hours to obtain a silica powder having a pore size distribution of from 75 to 300 Å, an average pore size of 180 Å and a pore volume of 0.8 cc/g. By using this powder, coating was conducted in the same manner as in Example 1. The size and volume of the spaces among the particles in the coating layer, were substantially the same as in Example 1.

Ink dots with a diameter of 100 μm having excellent roundness, were obtained, and the color density was 1.52.

EXAMPLE 3

Silica particles composed of 95% of spherical particles having a spherical degree of from 80 to 100 and 5% of the rest being substantially oval non-spherical particles, and having a particle size distribution of from 0.3 to 12 μm with the central value of 5.3 μm, an average pore size of 450 Å, a specific surface area of 245 m$^2$/g and a pore volume of 1.5 cc/g, were formed into pellets having a diameter of 2 cm, a thickness of 0.5 cm and a bulk density of 0.5 g/cc by means of a hydraulic press. Then, cyan and magenta of ink jet printer inks IJ20 CD manufactured by Canon Inc., were dropped onto the pellet at two separate spots by means of a microburette. The weight of each ink drop was about 10 mg.

Two hours after the dropping, the color densities of the ink dots having a diameter of about 7 mm, formed on the pellet, were measured by means of a reflective densitometer PDA45 manufactured by Konishiroku Photo Ind. Co. Ltd., whereby extremely high values of 2.09 for cyan and 2.20 for magenta were obtained. The dots had excellent roundness.

COMPARATIVE EXAMPLES 1 to 5

With respect to four different types of non-spherical silica powders (each having an apparent average particle size of from 1 to 2 μm as measured by an electron microscope), i.e. the one obtained by grinding commercially available Tokusil GUN (manufactured by Tokuyama Soda Co. Ltd.) by an agate mortar, Carplex

#80, Carplex FPS-4 (Shionogi & Co. Ltd.) and LoVel-27 (manufactured by PPG Co.), and a non-spherical product obtained by grinding the same spherical particles as used in Example 3, by an agate mortar to an average particle size of 1.5 μm, pellets were prepared to have the same size and the same bulk density as in Example 3, and the color densities were easured in the same manner as in Example 3, whereby in each case, the density was low as compared with that for the spherical particles.

| Comparative | | Color densities | | |
|---|---|---|---|---|
| Examples | Samples | Cyan | Magenta | Notes |
| 1 | Tokusil GUN | 1.33 | 1.27 | |
| 2 | Carplex #80 | 1.55 | 1.63 | |
| 3 | Carplex FPS-4 | 1.52 | 1.50 | The dots had poor roundness. |
| 4 | LoVel-27 | 1.16 | 1.08 | |
| 5 | Ground product of spherical particles | 1.65 | 1.72 | The ink absorption rate was small. |

EXAMPLES 4 to 6

The non-porous particles (Carplex #80 as mentioned above) were uniformly mixed to the same silica particles as in Example 1 in the ratio as identified in the following table. The mixture was combined with a polyvinyl alcohol PVA 117 binder manufactured by K.K. Kuraray in an amount of ¼ of the mixture, and the slurry thus obtained was coated on a copying paper and dried to obtain a coating layer having a thickness of 25 μm. Then, ink dots having a diameter of about 200 μm were formed on the coating layer by an ink jet printer PJ300 S Model, manufactured by Canon Inc., whereupon the presence or absence of the falling off of the powder, the roundness as measured by a microscope, and the color density by a microdensitometer PDM 5 manufactured by Konishiroku Photo Ind. Co. Ltd., were shown in the following table. In each case, the results were satisfactory.

| Examples | Non-spherical particles/ silica particles | Magenta color density | Falling of the powder |
|---|---|---|---|
| 4 | 0.3 | 1.49 | Nil |
| 5 | 0.2 | 1.54 | Nil |
| 6 | 0.1 | 1.56 | Nil |

EXAMPLE 7

A slurry of a mixture comprising Carplex #80 and PVA in the ratio of 4:1, was applied to a copying paper in a thickness of 25 μm in the same manner as in Example 4.

Then, onto this coating layer, a slurry of a mixture comprising the same silica particles as used in Example 1 and PVA 117 in a ratio of 4:1, was applied in a thickness of 10 μm.

After the application, the coated paper was dried at room temperature, and pressed by calender rolls while the coating layers were still half-dried, so that the silica particle layer was embedded into the intermediate coating layer to a depth of about 5 μm.

After drying, ink dots having a diameter of about 200 μm, were formed on the coating layer by means of the same printer as used in Example 4, whereby no falling of the powder was observed, the roundness of the ink dots was extremely good, and the color density of the magenta color was 1.58 as measured in the same manner as in Example 2.

EXAMPLE 8

With respect to silica particles composed of 95% of spherical particles having a spherical degree of from 80 to 100 and 5% of the rest being substantially oval non-spherical particles, and having a particle size distribution of from 0.3 to 12 μm with the central value of 5.3 μm, an average pore size of 100 Å, a specific surface area of 369 $m^2/g$ and a pore volume of 1.3 cc/g, pellets were prepared in the same manner as in Example 3, and the color density was evaluated, whereby extremely high values of 2.2 for cyan and 2.32 for magenta, were obtained. The dots had excellent roundness.

EXAMPLE 9

With respect to silica particles composed of 95% of spherical particles having a spherical degree of from 80 to 100 and 5% of the rest being substantially ovel non-spherical particles, and having a particle size distribution of from 0.3 to 12 μm with the central value of 5.3 μm, an average pore size of 250 Å, a specific surface area of 311 $m^2/g$ and a pore volume of 1.4 cc/g, pellets were prepared and the evaluation were conducted in the same manner as in Example 3. The color densities were as high as 2.18 for cyan and 2.26 for magenta. The dots had excellent roundness.

EXAMPLE 10

Into a stainless steel beaker having a capacity of 5 liters, 1 liter of sulfuric acid having a concentration of 16%, was charged, and a dilute solution ($SiO_2$ concentration: about 7%) of No. 3 water glass separately prepared, was dropwise added thereto under thorough stirring to bring the pH of the mixture to 3.0. The stirring was continued, and after gelation, the stirring was further continued for about 30 minutes. Then, 6N aqueous ammonia was dropwise added to bring the pH to 7.5. The slurry thus obtained was spray dryed to obtain substantially spherical particles having a particle size distribution of from 30 to 120 μm. The particles were repeatedly washed on a Bufuner funnel by means of a 1% ammonium carbonate solution to remove $Na^+$ and $SO_4^{--}$, and then baked at 350° C. for 2 hours. Then, the particles were pulverized in a vibration ball mill for 1 hour to obtain a silica powder having a particle size distribution of from 0.5 to 25 μm, from which a silica powder containing at least 95% of particles having a particle size of from 1 to 12 μm, was obtained. The average particle size was 4.5 μm. The pore size distribution was from 60 to 120 Å, the average pore size was 110 Å, and the pore volume was 1.1 cc/g. Then, a part of the powder was taken in a crucible and sintered at 1100° C. for 5 hours.

As the result, silica particles having no substantial pores, were obtained, which contained at least 95% of particles having a particle size of from 0.7 to 9 μm and which had an average particle size of 3.3 μm. The silica particles were again pulverized by a vibration ball mill to obtain silica particles containing at least 95% of particles having a particle size of from 0.2 to 5 μm and having an average particle size of 2.1 μm.

These two types of powders were formed into slurries, respectively, having a composition of silica/PVA=4/1 with a solid concentration of 17%.

Firstly, the viscous slurry obtained from the non-porous silica, was applied onto a base paper. When the coated paper was substantially dried, the viscous slurry obtained from the porous silica, was coated thereon and pressed under a pressure of 20 kg/cm$^2$ by calender rolls. After sufficiently drying the coating layers in a dryer, the thickness of the respective layers was examined by an electron microscope to obtain a values of about 20 μm and about 10 μm which were substantially the same as the designed values. The spaces among the particles in the intermediate layer, were from 0.2 to 1.4 μm.

Ink dots were printed on the recording sheet thus obtained, with a magenta color of an ink IJ20 C manufactued by Canon Inc. by means of an ink jet printer PJ300 S manufactured by Canon Inc. Immediately after the injection of the ink dots, the color density was low, and it was observed that after a while, a high density was reached. From the microscopic observation of the cross section of the dots, it was found that most of the ink was concentrated in the porous silica portion constituting the overlayer. A small amount of the remaining ink or trace was observed in the intermediate layer. This indicates that the ink drops were first held among the particles of the intermediate layer, and then transferred to the interior of the porous silica particles constituting the overlayer having excellent color developing properties. The color density of the printed ink dots was measured by a Sakura microdensitometer PDM-5 and found to be 1.56. The dots were substantially circular.

COMPARATIVE EXAMPLE 6

By using, instead of the non-porous silica used in Example 10, silica particles obtained by pulverizing a part of the porous silica employed for the coating of the overlayer in Example 10 by a vibration ball mill, which contain at least 95% of particles having a particle size of from 0.2 to 5 μm and which has an average particle size of 2.1 μm, the coating of an intermediate layer was conducted in the same manner as in Example 10. The same porous silica as used in the coating of the overlayer in Example 10, was coated as the overlayer.

Ink dots were printed on this recording sheet in the same manner as in Example 10, whereby most of the ink remained in the intermediate layer, and the ink color density was as low as 1.15.

EXAMPLE 11

Silica particles having an average pore size of 0.05 μm, a pore volume of 1.3 cc/g and an average particle size of 3.5 μm were combined with polyvinyl alcohol PVA 117 binder manufactured by Kurare K.K. in amount of ¼ of the weight of the silica particles, and the slurry thus obtained was applied to a copying paper and dried to obtain a coating layer having a thickness of 20 μm. Then, onto this coating layer, silica particles having an average pore size of 0.01 μm, a pore volume of 1.5 cc/g and an average particle size of 3.5 μm were, together with the above binder, coated and dried in the same manner as mentioned above.

The total thickness was 35 μm. Then, ink dots having a diameter of about 200 μm were formed on the recording sheet by means of an ink jet printer PJ300 S Model manufactured by Canon Inc., and measured for the roundness by means of a microscope and for the color density by means of a microdensitometer PDM-5 manufactured by Konishiroku Photo Ind. Co. Ltd. As the results, the roundness was adequately high, and the magenta color density was 1.58. From the microscopic observation of the cross section of the dots, it was found that the ink was present only in the overlayer and thus exhibited the high color density.

EXAMPLES 12 to 15 and COMPARATIVE EXAMPLES 7 and 8

A double layer coating was conducted in the same manner as in Example 11 by using silica particles as identified in the following table. The evaluation was conducted in the same manner as in Example 11 to obtain the results as shown in the table. The roundness was satisfactory in each case.

| | | Overlayer | Intermediate layer | Magenta color density | Location of the ink |
|---|---|---|---|---|---|
| Example 12 | Average pore size (μm) | 0.01 | 0.11 | 1.52 | Only in overlayer |
| | Pore volume (cc/g) | 1.5 | 1.2 | | |
| | Average particle size (μm) | 3.5 | 3.7 | | |
| | Layer thickness (μm) | 10 | 25 | | |
| Example 13 | Average pore size (μm) | 0.05 | 0.18 | 1.54 | Only in overlayer |
| | Pore volume (cc/g) | 1.3 | 1.6 | | |
| | Average particle size (μm) | 3.0 | 4.0 | | |
| | Layer thickness (μm) | 10 | 25 | | |
| Example 14 | Average pore size (μm) | 0.05 | 0.54 | 1.50 | Only in overlayer |
| | Pore volume (cc/g) | 1.4 | 1.4 | | |
| | Average particle size (μm) | 3.0 | 3.8 | | |
| | Layer thickness (μm) | 10 | 25 | | |
| Example 15 | Average pore size (μm) | 0.20 | 1.0 | 1.49 | Mostly in overlayer |
| | Pore volume (cc/g) | 1.3 | 1.0 | | |
| | Average particle size (μm) | 4.2 | 3.6 | | |
| | Layer thickness (μm) | 10 | 20 | | |
| Comparative Example 7 | Average pore size (μm) | 0.05 | 0.05 | 1.25 | In both overlayer and intermediate layer |
| | Pore volume (cc/g) | 1.3 | 1.3 | | |
| | Average particle size (μm) | 3.0 | 3.0 | | |
| | Layer thickness (μm) | 10 | 25 | | |
| Comparative Example 8 | Average pore size (μm) | 0.18 | 0.05 | 1.05 | Only in intermediate layer |
| | Pore volume (cc/g) | 1.6 | 1.3 | | |
| | Average particle size (μm) | 4.0 | 3.0 | | |
| | Layer thickness (μm) | 10 | 25 | | |

EXAMPLE 16

In accordance with the method described in Japanese Unexamined Patent Publication No. 54619/1984, a spherical particle powder having a spherical degree of from 80 to 100, an average particle size of 10 μm, a pore volume of 1.3 cc/g and an average pore size of 100 Å, was prepared. By using this powder, an aqueous slurry comprising silica and polyvinyl alcohol (PVA 117 manufactured by K.K. Kuraray) in a weight ratio of 4:1 and having a solid concentration of 18%, was prepared. This slurry was applied to a base paper (Ginwa, tradename, weight: 85 g/m$^2$) by a bar coater. After drying, the thickness was about 35 μm.

Separately, in accordance with the method described in Japanese Unexamined Patent Publication No. 54619/1984, a spherical fine particle powder having an average particle size of about 1 μm, a pore volume of 1.3 cc/g and an average pore size of 100 Å, was prepared. An aqueous paste comprising this powder silica and polyvinyl alcohol (PVA 117 manufactured by K.K. Kuraray) in a weight ratio of 8:1 and having a solid concentration of 22%, was prepared. This aqueous paste was applied onto the above-mentioned spherical silica-coated paper in such an extent to fill the void spaces on the above-mentioned particle surface. In a half dried state, this recording sheet was subjected to super calender treatment under a linear pressure of about 20 kg to make the surface smooth. The amount of the spherical fine particles coated was 1.6 g/m$^2$.

Then, a multi-color picture was printed by means of a Sharp ink jet printer IO-720. With respect to the substantially solid print portion having a magenta color, the color density, the diameter of the ink dot and the shape of the ink dot, were compared as between the recording sheet coated with the fine particles and the recording sheet without such coating. The results are as shown in the following table.

| Recording sheet | Image quality | Color density | Dot diameter (μm) | Dot shape |
|---|---|---|---|---|
| Recording sheet surface-treated with fine particles | Glossy and transparent appearance; Good resolution; Good color balance | 1.44 | 220 | Circular |
| Recording sheet with no surface-treatment | Slightly inferior color balance; Slightly roughened appearance | 1.23 | 180 | Circular |

EXAMPLE 17

In the same manner as in Example 16, silica spherica particles having the same spherical degree, pore volume and pore size as in Example 16 and an average particle size of 5 μm, were obtained, and they were applied to a base paper in the same manner as in Example 16. The thickness of the coating layer was about 35 μm.

On the other hand, spherical particles having a particle size of 5 μm was vigorously ground in water by means of a homogenizer to obtain a slurry containing non-spherical fine particles having an average particle size of about 0.5 μm. Polyvinyl alcohol (PVA 117 manufactured by K.K. Kuraray) was added to this slurry to obtain a paste comprising silica and PVA in a weight ratio of 8:1 and having a solid concentration of 22%. This paste was applied onto the coating layer of spherical particles in the same manner as in Example 16. When the coating layer is half-dried, the coated paper was subjected to super calender treatment under a linear pressure of about 20 kg to make the surface smooth. From the weight change after the drying, the amount of the coated fine particles was found to be 1.3 g/m$^2$. Then, the evaluation of the image quality of the picture print was conducted in the same manner as in Example 16. The color balance, the transparency appearance and the roughness, were substantially the same as in Example 16. The color density of the magenta in the recording sheet treated by the surface treatment, was 1.43, the dot diameter was 215 μm, and the shape of dot was circular.

EXAMPLE 18

In the same manner as in Example 17, the test for the image quality of a recording sheet was conducted. However, instead of using the slurry for the surface treatment, a silica powder (average particle size: 0.8 μm) having a bulk density of 0.08 obtained by spray drying the slurry, was coated in a dry system onto the paper by means of a buff. Then, the coated paper was subjected to super calender treatment to make the surface smooth. The coating amount was 1.5 g/m$^2$.

No peeling of the fine particles from the recording sheet, was observed. It is considered that the particle size was extremely small, and the inter-particle bonding or aggregation took place by the dry-system coating. The evaluation of the image quality of the picture print was conducted by using this recording sheet. The color balance, transparent appearance, roughening, etc. were substantially the same as in Example 16. The color density of the magenta was 1.44, the dot diameter was 225 μm, and the shape of dot was circular.

EXAMPLE 19

The test of the image quality of the recording sheet was conducted in the same manner as in Example 17. However, for the surface treatment, a super fine powder i.e. Aerosil 200 (average particle size of the primary particles: 12 μm), manufactured by Nippon Aerosil Co., was used, and the dry system surface treatment was conducted in the same manner as in Example 18. The super calender treatment was also conducted. The coating amount was 1.2 g/m$^2$. In the same manner as in Example 18, no peeling of super fine particles, was observed.

The evaluation of the image quality of the picture print was conducted by using the recording sheet. The color balance, transparent appearance, roughening, etc. were substantially the same as in Example 16. The color density of the magenta was 1.43, the dot diameter was 220 μm and the shape of the dot was circular.

EXAMPLE 20

In accordance with the method described in Japanese Patent Application No. 68766/1986, a fused spherical silica powder having a particle size of about 10 μm, a pore volume of 1.5 cc/g and an average pore size of 150 Å, was obtained. By using this powder, a fused particle layer having a thickness of about 40 μm was formed in the same manner as in Example 16. Further, in the same manner as in Example 16, the surface treatment with fine silica particles for smoothness was conducted.

Then, the evaluation of the image quality of a picture print on the recording sheet was conducted. The color balance, transparent appearance, roughness, etc. were substantially the same as in Example 16. The color density of the magenta was 1.53, the dot diameter was 215 μm and the shape of the dot was circular.

EXAMPLE 21

Prior to the application of the spherical particles and the treatment for smoothness in Example 16, Tokusil GUN (average particle size: 9 μm) manufactured by Tokuyama Soda Co. Ltd. was coated in a thickness of about 20 μm on the base sheet as an intermediate layer. With respect to the recording sheet thus obtained, the same evaluation as in Example 16 was conducted. The color density of the magenta was 1.53, the dot diameter was 210 μm, and the shape of the dot was circular.

We claim:

1. A recording sheet comprising a sheet of paper and porous particles provided on the paper surface, said porous particles having an average pore size of from 10 to 5000 Å, a pore volume of from 0.05 to 3.0 cc/g and an average particle size of from 0.1 to 50 μm, wherein the porous particles are provided on the paper surface, in the form of an overlayer formed on an intermediate layer of other particles, said intermediate layer being a layer of particles which do not substantially absorb an ink.

2. The recording sheet according to claim 1, wherein the porous particles are provided on the paper surface so that void spaces exist among them.

3. The recording sheet according to claim 2, wherein the void spaces among the particles are from 0.01 to 10 μm.

4. The recording sheet according to claim 2, wherein the volume of the void spaces among the particles is from 0.1 to 3.5 cc/g of the particles.

5. The recording sheet according to claim 1, wherein the porous particles are made of a material selected from the group consisting of silica, silica-alumina, alumina, silica-boria and silica-magnesia.

6. The recording sheet according to claim 1, wherein at least 30% by weight of the porous particles are spherical particles.

7. The recording sheet according to claim 6, wherein the spherical particles have a spherical degree of from 60 to 100.

8. The recording sheet according to claim 6, wherein among the porous particles, less than 70% of the non-spherical particles have an average particle size of from 0.1 to 20 μm.

9. The recording sheet according to claim 1, wherein the particles which do not substantially absorb an ink, have an average particle size of from 0.05 to 200 μm.

10. The recording sheet according to claim 1, wherein the intermediate layer has an apparent thickness of from 5 to 300 μm.

11. The recording sheet according to claim 1, wherein the overlayer of the porous particles has an apparent thickness of from 1 to 75 μm.

12. A recording sheet comprising a sheet of paper and porous particles provided on the paper surface, said porous particles having an average pore size of from 10 to 5000 Å, a pore volume of from 0.05 to 3.0 cc/g and an average particle size of from 0.1 to 50 μm, wherein the porous particles are in the form of a layer, and a coating layer composed of particles having an average particle size smaller than the average particle size of said porous particles is formed on the surface of the layer of the porous particles so that the surface of the porous particles is made smooth.

13. The recording sheet according to claim 12, wherein the porous particles are provided on the paper surface so that void spaces exist among them.

14. The recording sheet according to claim 13, wherein the void spaces among the particles are from 0.01 to 10 μm.

15. The recording sheet according to claim 13, wherein the volume of the void spaces among the particels is from 0.1 to 3.5 cc/g of the particles.

16. The recording sheet according to claim 12, wherein the porous particles are made of a material selected from the group consisting of silica, silica-alumina, alumina, silica-boria and silica-magnesia.

17. The recording sheet according to claim 12, wherein at least 30% by weight of the porous particles are spherical particles.

18. The recording sheet according to claim 17, wherein the spherical particles have a spherical degree of form 60 to 100.

19. The recording sheet accrding to claim 17, wherein among the porous particles, less than 70% of the non-spherical particles have an average particle size of from 0.1 to 20 μm.

20. The recording sheet according to claim 12, wherein the porous particles are provided on the paper surface in the form of an overlayer formed on an intermediate layer of other particles.

21. The recording sheet according to claim 20 wherein the intermediate layer is a layer of particles which do not substantially absorb an ink.

22. The recording sheet according to claim 21, wherein the particles which do not substantially absorb an ink, have an average particle size of from 0.05 to 200 μm.

23. The recording sheet according to claim 20 wherein the intermediate layer has an apparent thickness of from 5 to 300 μm.

24. The recording sheet according to claim 20, wherein the overlayer of the porous particles has an apparent thickness of from 1 to 75 μm.

25. The recording sheet according to claim 20 wherein the intermediate layer is composed of porous particles having an average pore size larger than the average pore size of the porous particles constituting the overlayer, and the overlapping degree of the pore sizes of the two types of the porous particles, is not higher than 30% as represented by the pore volume.

26. The recording sheet according to claim 25, wherein the porous articles constituting the intermediate layer, have an average pore size of from 0.05 to 5 μm, a pore volume of from 0.05 to 3.0 cc/g and an average particle size of from 0.1 to 50 μm.

27. The recording sheet according to claim 25, wherein the apparent thickness of the intermediate layer is from 1 to 75 μm.

28. The recording sheet according to claim 25, wherein the apparent thickness of the overlayer of the porous particles, is from 1 to 75 μm.

* * * * *